(12) United States Patent
Odate et al.

(10) Patent No.: US 7,254,342 B2
(45) Date of Patent: Aug. 7, 2007

(54) METHOD AND SYSTEM FOR TRANSMITTING INFORMATION IN AN OPTICAL COMMUNICATION SYSTEM WITH LOW SIGNAL DISTORTION

(75) Inventors: Kaori Odate, Kanagawa (JP); Olga I. Vassilieva, Plano, TX (US); Takeshi Hoshida, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 686 days.

(21) Appl. No.: 10/696,375

(22) Filed: Oct. 29, 2003

(65) Prior Publication Data

US 2005/0095007 A1 May 5, 2005

(51) Int. Cl.
*H04B 10/12* (2006.01)
(52) U.S. Cl. .................. 398/148; 398/193; 398/200
(58) Field of Classification Search .............. 398/81, 398/147–148, 193, 200
See application file for complete search history.

(56) References Cited

U.S. PATENT DOCUMENTS

| | | | | |
|---|---|---|---|---|
| 5,559,920 | A * | 9/1996 | Chraplyvy et al. | 385/123 |
| 5,717,510 | A * | 2/1998 | Ishikawa et al. | 398/199 |
| 5,877,879 | A * | 3/1999 | Naito | 398/91 |
| 5,877,881 | A * | 3/1999 | Miyauchi et al. | 398/193 |
| 6,263,139 | B1 * | 7/2001 | Kawakami et al. | 385/123 |
| 6,404,950 | B1 * | 6/2002 | Tsukitani et al. | 385/27 |
| 6,427,043 | B1 * | 7/2002 | Naito | 385/123 |
| 6,681,082 | B1 * | 1/2004 | Tanaka et al. | 398/158 |
| 6,731,877 | B1 * | 5/2004 | Cao | 398/91 |

OTHER PUBLICATIONS

Konrad, et al., *Dispersion Compensation Schemes for 160 Gb/s TDM-Transmission Over SSMF and NZDSF*, Technical University Berlin, Germany, ECOC 2001 (2 pages).
Pizzinat, et al., *40-Gb/s Systems on G.652 Fibers: Comparison Between Periodic and All-at-the-End Dispersion Compensation*, © 2002 IEEE, Journal of Lightwave Technology, vol. 20, No. 9, Sep. 2002 (6 pages).
Mecozzi, et al., *Optical Amplifiers and Their Applications*, OSA Trends in Optics and Photonics Series, vol. 44, From the Topical Meeting on Optical Amplifiers and Their Applications, Jul. 9-12, 2000, Quebec, Canada (4 pages).
Park, et al., *40-Gb/s Transmissions Over Multiple 120-km Spans of Conventional Single-Mode Fiber Using Highly dispersed Pulses*, © 2000 IEEE, IEEE Photonics Technology Letters, vol. 12, No. 8, Aug. 2000 (5 pages).

* cited by examiner

*Primary Examiner*—Leslie Pascal
(74) *Attorney, Agent, or Firm*—Baker Botts L.L.P.

(57) ABSTRACT

A method is provided for transmitting information in an optical communication system that includes transmitting an optical information signal at a wavelength over an optical link with a first and second end. The optical information signal is pre-distorted for dispersion proximate the first end of the optical link. The optical information signal is then compensated proximate the second end of the optical link for dispersion, wherein the pre-distortion and the compensation have opposite polarity at the transmitting wavelength.

39 Claims, 2 Drawing Sheets

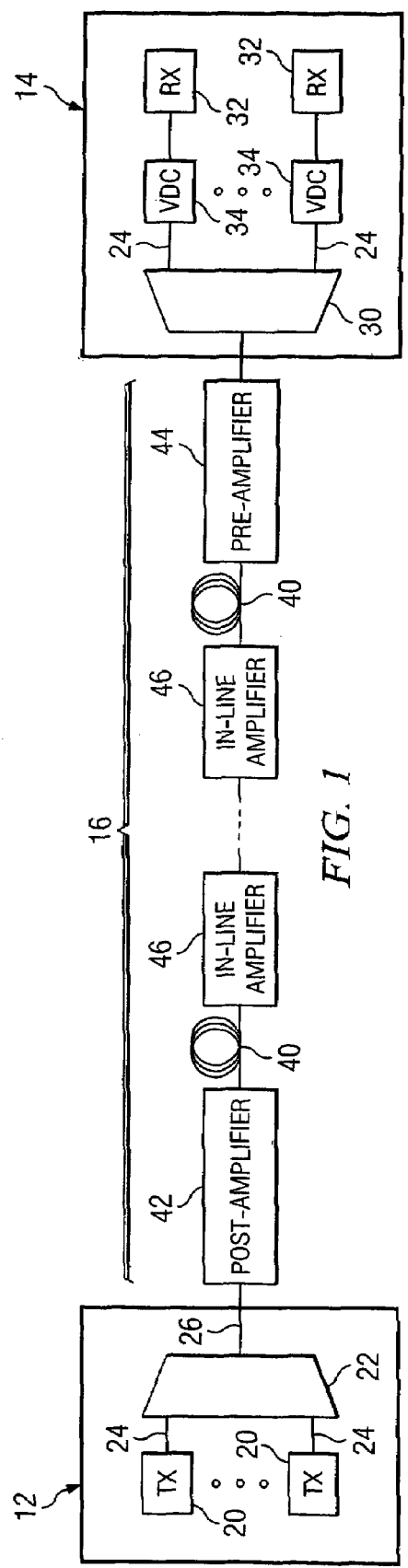
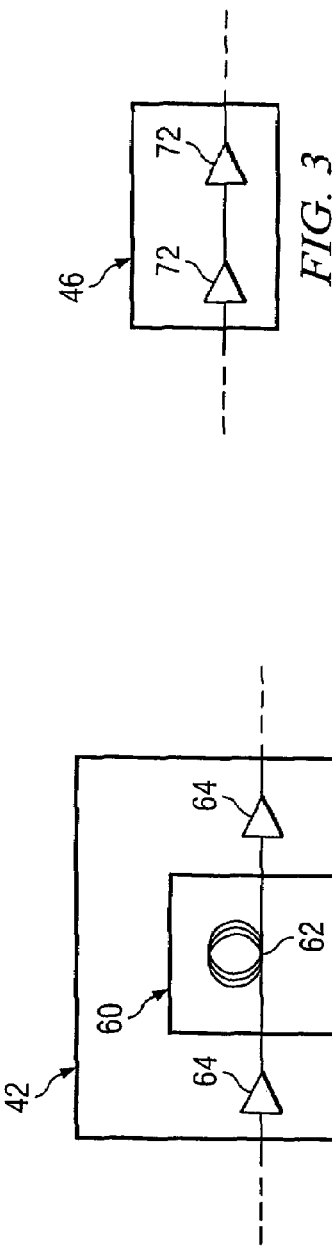
FIG. 1
FIG. 2
FIG. 3

METHOD AND SYSTEM FOR TRANSMITTING INFORMATION IN AN OPTICAL COMMUNICATION SYSTEM WITH LOW SIGNAL DISTORTION

TECHNICAL FIELD

The present invention relates generally to optical communication networks, and more importantly to a method and system for transmitting information in an optical communication system with low signal distortion.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting a signal over long distances with very little loss. The optical signals have at least one characteristic modulated to encode audio, video, textual, real time, non-real time, and/or other suitable data.

Optical networks often employ wavelength division multiplexing (WDM) or dense wavelength division multiplexing (DWDM) to increase transmission capacity, which can be tens to several hundred Gigabits per second (Gb/s). In WDM and DWDM networks, a number of optical channels are carried in each fiber at disparate wavelengths. Network capacity is increased as a multiple of the number of wavelengths, or channels, in each fiber.

The maximum distance that optical signals can be transmitted in a WDM or other optical network is limited, in part, by dispersion and nonlinear effects. For example, chromatic dispersion widens optical pulses transmitting over an optical link, creating in intersymbol interference. Chromatic dispersion results from the frequency dependence of the refractive index of silica as well as waveguide contributions to the effective refractive index. Furthermore, optical signals traveling at high peak power levels, such as high-bit rate WDM signals (e.g., 40, 80, or 160 Gb/s), are subject to nonlinear distortions not discernable at low fiber input power. As bit rates increase, the optical signal-to-noise (OSNR) becomes critical, so high fiber input power is used in an attempt to satisfy the OSNR requirement. However, higher fiber input power leads to signal degradation from fiber nonlinearities, such as self-phase modulation (SPM).

To transmit high-bit rate signals over long distances, for example 160 Gb/s over 1500 km, optical networks typically include a number of dispersion compensating modules spaced ($\approx$100 km) along each optical link which has an opposite dispersion effect for a specific range of wavelengths to most transmission optical fibers. Accurately managing these dispersion compensating modules typically includes measuring the dispersion value in advance at each repeater node to prevent an error in dispersion compensation, employing a plurality of dispersion compensating modules with a variety of fiber spans and types, and re-adjusting or re-designing the dispersion compensating modules based on the dispersion compensating value.

SUMMARY

A method and system for transmitting information in an optical communication system with low signal distortion are provided. In particular, a wavelength division multiplexing (WDM), dense wavelength division multiplexing (DWDM), or other optical information signals may be pre-distorted for dispersion prior to transmission over a substantial portion of an optical link.

In one embodiment, a method for transmitting information in an optical communication system includes transmitting an optical information signal at a wavelength over an optical link with a first and second end. The optical information signal is pre-distorted for dispersion proximate the first end of the optical link. The optical information signal is then compensated proximate the second end of the optical link for dispersion, wherein the pre-distortion and the compensation have opposite polarity at the transmitting wavelength. More specifically, in a particular embodiment, the optical signal may be amplified in-line along the optical link without dispersion compensating module (DCM).

Technical advantages of one or more embodiments may include reducing nonlinear distortions caused by the interaction of self-phase modulation and group velocity dispersion (SPM-GVD) by pre-distorting the optical information signal proximate the transmitter and compensating the signal proximate the receiver without in-line DCMs. Other advantages of one or more embodiments may include easing the burden of the configuration, installation, and maintenance of dispersion compensating equipment because dispersion compensation is managed at the end of the optical link rather than in a distributed manner as in conventional systems.

Still another technical advantage of one or more embodiments may include an average Eye opening penalty less than a conventional span-by-span dispersion map if the dispersion addition at the transmitter (DAT) and the dispersion compensation at the receiver (DCR) are appropriately chosen. Other advantages of one or more embodiments may include a reduction in the inventory of dispersion compensation modules since in-line management of dispersion is not needed, which requires a plurality of dispersion compensating modules (DCM) with a variety of fiber types and span links. In one embodiment, in-line dispersion compensation may be reduced, minimized, or eliminated and thus the necessity of managing the dispersion compensating error may be reduced, minimized, or eliminated. Still another advantage of one or more embodiments may include simplifying temperature control by having dispersion compensation in a central office.

It will be understood that none, some or all embodiments may include the above enumerated technical advantages. It will be further understood that the method and system may include other technical advantages that will be apparent from the following figures, descriptions and claims.

BRIEF DESCRIPTION OF THE DRAWINGS

For a more complete understanding of the present invention and its advantages, reference is now made to the following description, taken in conjunction with the accompanying drawings, in which:

FIG. 1 illustrates one embodiment of an optical communication system;

FIG. 2 illustrates one embodiment of a post-amplifier for the optical communication system of FIG. 1;

FIG. 3 illustrates one embodiment of an in-line amplifier for the optical communication system of FIG. 1;

DETAILED DESCRIPTION OF THE DRAWINGS

Figure 4:
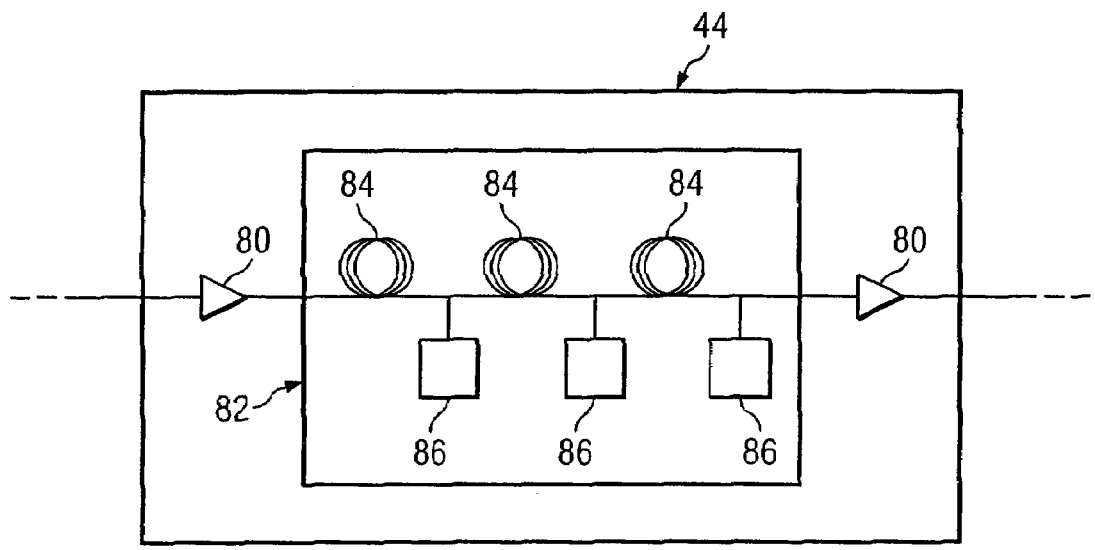
FIG. 4 illustrates one embodiment of a pre-amplifier for the optical communication system of FIG. 1.

FIG. 1 illustrates one embodiment of an optical communication system 10. In this embodiment, the optical communication system 10 is a wavelength division multiplex (WDM) system such as a dense WDM system in which a number of optical channels are carried over a common path at a disparate wavelength. It will be understood that the optical communication system 10 may comprise other suitable single channel, multi-channel, or bi-directional transmission systems.

Referring to FIG. 1, the WDM system 10 includes a WDM transmitter 12 at a source end point or node and a WDM receiver 14 at a destination end point or node coupled together by an optical link 16. The WDM transmitter 12 and WDM receiver 14 each comprise a card shelf or other module including transmitters, receivers, and control units. In one particular example, the optical link 16 is 1500 kilometers or longer. In another embodiment, the optical link 16 is approximately 500 kilometers. In yet another embodiment, the optical link is approximately 200 kilometers long. The WDM transmitter 12 transmits data in a plurality of optical signals or channels over the optical link 16 to the remotely located WDM receiver 14. The WDM transmitter 12, WDM receiver 14, and optical link 16 may form part of a long haul, metro core, or other suitable network or combination of networks.

The WDM transmitter 12 includes a plurality of optical transmitters 20 and a WDM multiplexer 22. The optical transmitter 20 may form part of a transponder or other node element. Each optical transmitter 20 generates an optical information signal 24 on one of a set of distinct wavelengths $\lambda_1, \lambda_2 \ldots \lambda_n$ at a certain channel spacing. For example, in a particular embodiment, channel spacing may be 100 Giga Hertz (GHz). The channel spacing may be selected to avoid or minimize cross talk between adjacent channels. The optical information signals 24 comprise optical signals with at least one characteristic modulated to encode audio, video, textual, real time, non-real time, or other suitable data. The optical information signals 24 are multiplexed into a single WDM signal 26 by the WDM multiplexer 22 for transmission over the optical link 16. The optical information signal 24 may be otherwise suitably combined into the WDM signal 26.

The WDM receiver 14 receives, separates and decodes the optical information signals 24 to recover the included data. In one embodiment, the WDM receiver 14 includes a WDM demultiplexer 30 and a plurality of optical receivers 32. Each optical receiver 32 may be coupled to the demultiplexer 30 through a variable dispersion compensator (VDC) 34. While not illustrated, each optical receiver 32 may be coupled to a polarization mode dispersion compensator (PMDC) in addition to the VDC 34 or may alternatively be used in place of the VDC 34. The optical receiver 32 may form part of a transponder or other node element. The WDM demultiplexer 30 demultiplexes the optical information signal 24 from the single WDM signal 26 and sends each optical information signal 24 to a VDC 34 and optical receiver 32. A PMDC compensates for polarization mode dispersion. A VDC compensates for chromatic dispersion. Each optical receiver 32 may be coupled to other suitable dispersion compensators operable to compensate the optical information signals 24 at the WDM receiver 14. Each optical receiver 32 optically or electrically recovers the encoded data from the corresponding signal 24. As used herein, the term each means every one of at least a subset of the identified items.

The optical link 16 comprises optical fiber 40 or other suitable medium in which optical signals may be transmitted with low loss. In one embodiment, the optical fiber 40 may comprise single mode fiber (SMF). An optical link includes an optical medium, which may have devices between a transmitter node and a corresponding receiver node. In one embodiment, the optical link 16 includes an optical fiber, a post-amplifier, in-line amplifiers, and a pre-amplifier. Proximate the transmitter 12 are one or more post-amplifiers 42, which are coupled to the optical fiber 40. As used herein, proximate the transmitter 12 means at or after the transmitter 12 prior to transmission over a significant portion (e.g., 5%, 10%, 15%) of the optical link 16. Proximate the transmitter 12 may mean within the same card, node, central or other office. In one embodiment, the post-amplifier 42 is within 5 kilometers of the transmitter 12. Interposed along the optical link 16 are one or more optical in-line amplifiers 46, which are coupled to the optical fiber 40. Proximate the receiver 14 are one or more pre-amplifiers 44, which are coupled to the optical fiber 40. As used herein, proximate the receiver 14 means at or before the receiver 14 without transmission over a significant portion (e.g., 5%, 10%, 15%) of the optical link 16. Proximate the receiver 14 may mean within the same card, node, central or other office. In one embodiment, the pre-amplifier 44 is within 5 kilometers of the receiver 14. As used herein, "in-line device" means a device in the portion of the optical link 16 not proximate the transmitter 12 or proximate the receiver 14. While FIG. 1 illustrates the post-amplifier 42 and pre-amplifier 44 after the WDM transmitter 12 and before the WDM receiver 14, respectively, each may form part of the transmitter and receiver nodes, respectively. The optical amplifiers 42, 44, and 46 increase the strength or boost one or more of the optical information signals 24 and thus the WDM signal 26 without the need for optical-to-electrical conversion.

In one embodiment, the optical amplifiers 42, 44, and 46 comprise discrete amplifiers or distributed amplifiers or both. Discrete amplifiers may comprise rare earth doped fiber amplifiers such as erbium-doped fiber amplifiers (EDFAs) and other suitable amplifiers operable to amplify the WDM signal 26 at a point in the optical link 16. Distributed amplifiers amplify the WDM signal 26 along an extended length of the optical link 16 and may comprise a distributed Raman amplifier (DRA). The optical amplifiers 42 and 44 may include dispersion addition modules (DAM) and dispersion compensation modules (DCM), respectively, to provide pre-distortion for dispersion proximate the transmitter and dispersion compensation proximate the receiver, respectively. However, the in-line amplifiers 46 do not include DCMs.

The WDM transmitter 12, WDM receiver 14, and optical link 16 are selected, designed, and configured to transmit data at a specific or otherwise defined rate. For example, in operation each optical transmitter 20 may transmit a 10 Gigabit per second (Gb/s), 20 Gb/s, 40 Gb/s, 80 Gb/s or 160 Gb/s signal. As bit rates increase, the optical signal-to-noise (OSNR) becomes critical, so high fiber input power is used to satisfy OSNR requirements. However, higher fiber input power leads to severer signal degradation from nonlinear effects, such as the interplay between self-phase modulation and group velocity dispersion (SPM-GVD). In a particular embodiment, pre-distortion for dispersion proximate the transmitter (DAT) may be provided to reduce the peak pulse power, may be done in post-amplifier 42 in connection with an amplifier. In one embodiment, a DAT value is between 0 to 3000 ps/nm.

In a particular embodiment, dispersion compensation proximate the receiver (DCR) is provided without in-line dispersion compensating modules (DCMs). It will be understood that DCMs may include dispersion compensating fiber devices, non-fiber devices, or any combination thereof. As used herein, in-line DCM means a DCM in the portion of the optical link 16 not proximate the transmitter 12 or proximate the receiver 14. Thus, the in-line dispersion value, which is typically a positive value at 1550 nm band, is not controlled or adjusted by transmitting over in-line DCMs. By reducing, eliminating, or minimizing in-line DCMs, the present invention may reduce, eliminate, or minimize the parameters that have to be strictly managed in the system design, installation, and operation, i.e., the dispersion compensation error after each DCM. As a result, SPM-GVD, which depends, in part, on the dispersion compensation error, can be reduced along the optical link 16 if the DAT and DCR are appropriately set, and thus the cost of installation and maintenance may be reduced.

The electronics of the WDM transmitter 12, the optical link 16, and the WDM receiver 14 are selected, configured, positioned or otherwise designed to provide acceptable OSNR, bit rate error (BER), and Eye opening penalty. For example, the DCR may be designed to provide accurate dispersion compensation and to obtain high OSNR at the designated bit rate. It will be understood that dispersion may include, where appropriate, chromatic dispersion, modal dispersion, polarization mode dispersion, or other types of dispersion resulting in the broadening of a signal pulse. In a particular example, the average Eye opening penalty can be less than a conventional span-by-span dispersion map for high-bit rates such as 160 Gb/s, if the DCR value is precisely adjusted and the DAT value is appropriately chosen. In one embodiment, the DAT value is appropriately chosen using iterative steps between 0 to 3000 ps/nm. A single channel system with a channel spacing of 75 GHz was simulated by solving the nonlinear Schroedinger equation using a split-step Fourier method. The bit rate was 86 Gb/s with 6 spans of SMF fiber, wherein each span was 100 km and a RZ-DPSK modulation format. The average eye-opening penalty over a repeater output power range from −6 to 6 dBm/ch was consistently higher for a conventional optical system as opposed to a quasi linear system, i.e., a system without in-line DCMs. Since the optical pulses disperse rapidly, the nonlinear effects are reduced due to an averaging effect. Even though this kind of transmission is highly nonlinear, it has characteristics similar to linear transmission, therefore it will be referred to as quasi linear. For a repeater output power of 2 dBm/ch, the average eye opening penalty for a conventional optical system was 0.8 dB while the quasi linear system was 0.4 dB. The optical DAT value was 1000 ps/nm and DCR value was −11,200 ps/nm. Additionally, the DCR does not have to be adjusted with more precision than adjustments necessary in a conventional dispersion map.

FIG. 2 illustrates one embodiment of the post-amplifier 42 of FIG. 1. In this embodiment, the post-amplifier 42 comprises amplifiers 64 and a dispersion addition module (DAM) 60. Amplifiers 64 increase the strength or boost the single WDM signal 26 for attenuation resulting from the DAM 60 or other losses due to the transmission of a single WDM signal 26. In one particular example, the optical amplifiers 64 comprise rare earth doped fiber amplifiers such as erbium-doped fiber amplifiers (EDFAs).

The DAM 60 includes a dispersive fiber (DF) 62 with the same dispersion effect as the optical fiber 40. In one embodiment, the DF 62 has the same polarity as the optical fiber 40, typically resulting in positive dispersion. The DF 62 disperses the single WDM signal 26 proximate the WDM transmitter 12. Other suitable dispersion devices may be used to disperse the signal proximate the WDM transmitter 12, such as fiber Bragg grating and virtually imaged phased array (VIPA). Since a positive DAT value widens the optical pulses of an optical signal, the peak pulse power of the single WDM signal 26 is reduced. In a particular example, the positive dispersion value is 1000 ps/nm for a DF 62 with a dispersion coefficient of 17 picoseconds per nanometer per kilometer (ps/nm/km). As a result, nonlinear effects such as SPM-GVD may be reduced along the optical fiber 40. In one embodiment, the polarity of the DAM value is opposite the optical link 16 and the absolute value of the DAM value is selected to be larger than the absolute value of the total chromatic dispersion over the optical link 16. In this embodiment, no point will exist along the optical link 16 such that the DAT and accumulated dispersion of the optical link 16 cancel each other out, which results in a large nonlinear effect due to a large peak power. In this embodiment, the polarity of the DAM value is opposite the polarity of the DCR.

FIG. 3 illustrates details of the in-line amplifier 46 of FIG. 1 in accordance with one embodiment of the present invention. In this embodiment, the in-line amplifier 46 comprises one or more discrete amplifiers 72. Though, the in-line amplifier 46 may comprise one or more distributed Raman amplifiers (DRAs) or other suitable amplifiers. The optical amplifiers 72 increase the strength or boost one or more of the optical information signals 24 and thus the WDM signal 26 for transmission losses over each span without need for optical-to-electrical conversions. Typically, the transmission loss is 25 dB for a 100 km span. In addition, in-line amplification of the single WDM signal 26 is done without DCMs.

The absence of DCMs for high-bit rates, such as 160 Gb/s, results in a quasi linear regime in SMF fiber and other suitable fiber, because the dispersion length is much shorter than the nonlinear length regime. Thus, the detrimental effects due to nonlinearities when pulses overlap may be reduced due to an averaging effect so the waveform distortion is reduced or minimized. Such nonlinear distortions include the interaction of self-phase modulation and group velocity dispersion (SPM-GVD). However, the dispersion design of the system must, in one embodiment, be carefully done so that the accumulated distortion does not become close to zero along the optical link 16, because that would result in a high peak pulse power at the zero point and thus cause a significant waveform distortion due to nonlinear effects.

In one embodiment, dispersion compensation is done proximate the receiver without in-line DCMs. Thus, the in-line dispersion value is not controlled or adjusted via the number of in-line DCMs. As a result, SPM-GVD, which depends, in part, on the accumulated dispersion error, is reduced along the module route. Additionally, dispersion compensation is managed at the end of the optical link rather than a distributed manner as in conventional systems, which significantly eases the burden of configuration, installation, and maintenance of dispersion compensating equipment.

FIG. 4 illustrates one embodiment of the pre-amplifier 44 of FIG. 1. In particular, the pre-amplifier 44 comprises amplifiers 80 and a dispersion compensator 82. Amplifiers 80 increase the strength or boost the single WDM signal 26 for attenuation resulting from the losses due to the transmission over the optical link 16. In this embodiment, pre-amplifier 44 is operable to compensate the single WDM signal 26 for dispersion occurring over the optical link 16 and amplify the single WDM signal 26. After an initial step resulting from the DAT, the profile of the accumulated dispersion as a function of the distance is approximately linear until the pre-amplifier 44, resulting in a step down. The remaining accumulated dispersion may be compensated by the variable dispersion compensators 34. In the illustrated embodiment, the dispersion compensator 82 comprises a Raman amplified dispersion compensating fiber (DCFRA). The amplifiers 80 and the dispersion compensator 82 may be intermixed. The DCFRA 82 may include one or more backward or counter pumping source lasers 86 to compensate for OSNR loss resulting from the high insertion loss of dispersion compensating fiber 84 coupled thereto. The amplification signal from the counter pumping laser 86 is launched in a direction of travel opposite that of the WDM signal 26 and thus is counter propagated with respect to the WDM signal 26. The DCFRA 82 may include one or more forward or co-propagating pump source lasers coupled to the dispersion compensating fiber(s) 84. The amplification signal from the forward pumping laser is launched in the same direction of travel as the WDM signal 26 and this is co-propagated with respect to the WDM signal 26. The Raman pump source 86 comprises semiconductor or other suitable lasers capable of generating a pump-like or amplification signal capable of amplifying the WDM signal 26 including one, more, or all of the included optical information signals 24. The pump source 86 may be depolarized, polarization scrambled, or polarization multiplexed to minimize polarization sensitivity of Raman gain.

The DCM 82 has a polarity opposite the optical fiber 40, typically resulting in negative (i.e., normal) dispersion. The DCM 84 compensates the single WDM signal 26 proximate the receiver 14 for dispersion over the optical fiber 40. Other suitable dispersion compensators may be used to compensate the signal proximate the WDM receiver 14, such as fiber Bragg gratings or VIPA. In a particular example, the negative dispersion value is −11,200 ps/nm for the DCM 84 with a dispersion coefficient of −80 picoseconds per nanometer per kilometer (ps/nm/km).

In particular, if the DAT value is appropriately chosen and the DCR value is precisely adjusted, the optical information signal incurs less penalty than a conventional span-by-span dispersion map for high-bit rates. The dispersion compensating effect for various DAT and DCR values may be simulated by solving the nonlinear Schroedinger equation using a split-step Fourier method. Additionally, the DCR value does not have to be adjusted with more precision than adjustments necessary in optimizing a conventional dispersion map. In a particular example, the average eye opening penalty for an optical system with a 1000 ps/nm DAT value and a DCR value of −11,200 ps/nm is 0.4 dB. This simulation includes in-line amplification of 2 dBm/ch.

Figure 5:
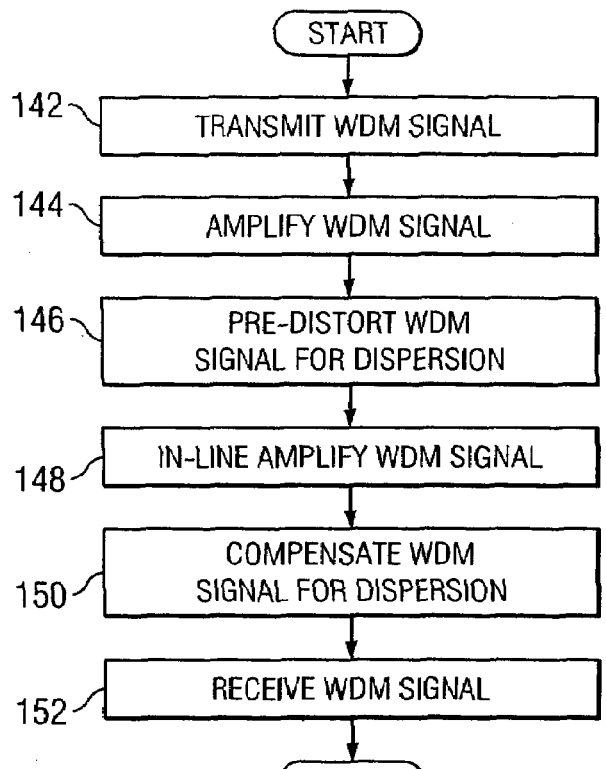
FIG. 5 illustrates one embodiment of a method for transmitting information in an optical communication system of FIG. 1.

FIG. 5 illustrates one embodiment of a method for transmitting information in an optical communication system. In this embodiment, an optical signal pre-distorted for dispersion is compensated only proximate the receiver and the signal is amplified during transmission without the use of DCMs. Though, there could be additional in-line compensation. Referring to FIG. 5, the method begins at step 142 in which the optical information signals 24 are multiplexed into the WDM signal 26 and the WDM signal 26 is transmitted in the optical link 16. Signals may be generated by the transmitters 20, and multiplexed by the multiplexer 22.

Proceeding to step 144, the single WDM signal 26 is amplified proximate the transmitter 12 utilizing discrete or distributed amplification or both. As previously described above, the single WDM signal 26 may be amplified at discrete points using EDFAs and distributably amplified using bi-directional DRAs, which may be done at the post-amplifier 42.

Next, at step 146, the single WDM signal 26 is pre-distorted for dispersion proximate the WDM transmitter 12 to reduce or minimize the eye opening penalty. As previously described above, the pre-distortion, which may be done at the post-amplifier 42 with amplification, reduces both peak pulse power and thus lessening nonlinear effects.

Proceeding to step 148, the single WDM signal 26 is amplified along the optical link 16 using discrete or distributed amplification, or both without DCMs. The absence of in-line DCMs may eliminate in-line dispersion compensating error and thus SPM-GVD, as discussed above. As previously described above, the single WDM signal 26 may be amplified at discrete points using EDFAs or distributed points using DRAs or at points using a combination of both.

At step 150, the WDM signal 26 is compensated for dispersion proximate the receiver 14. The single WDM signal 26 may be compensated by Raman amplified DCMs or erbium-doped amplifiers or DRAs or DCMs or any combination thereof. The dispersion compensation is done in large part by the pre-amplifier 44 and the rest is done on a channel-by-channel basis by the variable compensators 34. Next at step 152, the WDM signal 26 is received, demultiplexed, and decoded by the WDM receiver 14, as discussed above. In this way, it transmits high-bit rates over long-haul with low signal distortion.

Although the present invention has been described with several embodiments, various changes and modifications may be suggested to one skilled in the art. It is intended that the present invention encompass such changes and modifications as fall within the scope of the appended claims.

The invention claimed is:

1. A method for transmitting information in an optical communication system, comprising:
   transmitting an optical information signal at a wavelength over an optical link with a first and a second end;
   pre-distorting for dispersion the optical information signal proximate the first end of the optical link to introduce an initial dispersion in the optical signal in the amount of at least 1000 picoseconds per nanometer (ps/nm), wherein this initial dispersion causes a widening of optical pulses of the optical signal;
   amplifying the optical signal in-line on the optical link between a transmitter and a receiver without the use of any in-line dispersion compensating modules; and
   compensating the optical information signal proximate the second end of the optical link for dispersion, wherein the pre-distortion and the compensation have opposite polarity at the transmitting wavelength and wherein the compensation is in the amount of at least 10,000 ps/nm.

2. The method of claim 1, wherein pre-distorting for dispersion occurs at a node in a first office including a transmitter.

3. The method of claim 1, wherein compensating the optical signal occurs at a node in a second office including a receiver.

4. The method of claim 1, further comprising amplifying the signal proximate the second end of the optical link in connection with compensating the optical signal.

5. The method of claim 4, wherein the optical information signal is amplified by a distributed Raman amplifier (DRA).

6. The method of claim 4, wherein the optical information signal is amplified by an erbium-doped fiber amplifier.

7. The method of claim 1, further comprising amplifying the optical signal proximate the first end of the optical link in connection with pre-distorting for dispersion.

8. The method of claim 1, wherein the optical information signal is amplified proximate the first end of the optical link by an erbium-doped fiber amplifier.

9. The method of claim 1, wherein the optical information signal is pre-distorted for dispersion by a dispersion compensating module having a same polarity as the optical link.

10. The method of claim 1, wherein the optical information signal is transmitted over a 200 kilometer section of the optical link without transmitting over a dispersion compensating module.

11. The method of claim 1, wherein the optical information signal is transmitted over a 500 kilometer section of the optical link without transmitting over a dispersion compensating module.

12. The method of claim 1, wherein the optical information is signal is transmitted over a 1000 kilometer section of the optical link without transmitting over a dispersion compensating module.

13. The method of claim 1, wherein the optical information signal has a bit rate of 40 Gb/s or above.

14. The method of claim 1, wherein the optical information signal is compensated proximate the second end of the optical link for dispersion by a dispersion compensating module.

15. The method of claim 14, wherein the dispersion compensation module comprises at least one Raman amplified dispersion compensating fiber (DCFRA).

16. The method of claim 1, wherein the optical information signal is compensated proximate the second end of the optical link for dispersion by two or more amplifiers with two or more dispersion compensating modules.

17. An optical communication system, comprising:
means for transmitting an optical information signal at a wavelength over an optical link with a first end and a second end;
means for pre-distorting for dispersion the optical information signal proximate the first end of the optical link to introduce an initial dispersion in the optical signal in the amount of at least 1000 picoseconds per nanometer (ps/nm), wherein this initial dispersion causes a widening of optical pulses of the optical signal;
means for amplifying the optical signal in-line on the optical link between a transmitter and a receiver without the use of any in-line dispersion compensating modules; and
means for compensating for dispersion the optical information signal proximate the second end of the optical link, wherein the pre-distortion and the compensation have opposite polarity at the transmitting wavelength and wherein the compensation is in the amount of at least 10,000 ps/nm.

18. The system of claim 17, further comprising means for amplifying the optical signal proximate the first end of the optical link in connection with the means for pre-distorting for dispersion.

19. A optical communication system, comprising:
an optical link with a first end and a second end;
a first dispersion device proximate the first end of the optical link configured to pre-distort optical information signals transmitted over the optical link to introduce an initial dispersion in the optical information signals in the amount of at least 1000 picoseconds per nanometer (ps/nm), wherein this initial dispersion causes a widening of optical pulses of the optical information signals;
a plurality of amplifiers configured to amplify the optical signal in-line on the optical link without the use of any in-line dispersion compensating modules; and
a second dispersion device proximate the second end of the optical link configured to compensate for dispersion in the optical information signals in the amount of at least 10,000 ps/nm, wherein the first and second dispersion devices have opposite polarities of dispersion.

20. The system of claim 19, wherein the first dispersion device is located at a node in a first office including a transmitter.

21. The system of claim 20, wherein the transmitter comprises one or more optical transmitters coupled to a wavelength division multiplexed multiplexer.

22. The system of claim 19, wherein the second dispersion device is located at a node in a second office including a receiver.

23. The system of claim 22, wherein the receiver comprises a wavelength division multiplexed demultiplexer coupled to one or more optical receivers.

24. The system of claim 23, further comprising one or more variable dispersion compensators coupled to the one or more optical receivers at the second end of the optical link.

25. The system of claim 19, wherein an optical information signal is transmitted over a 200 kilometer section of the optical link without transmitting over a dispersion compensating module.

26. The system of claim 19, wherein an optical information signal is transmitted over a 500 kilometer section of the optical link without transmitting over a dispersion compensating module.

27. The system of claim 19, wherein an optical information signal is transmitted over a 1000 kilometer section of the optical link without transmitting over a dispersion compensating module.

28. The system of claim 19, wherein the first dispersion device proximate the first end of the optical link configured to pre-distort for dispersion optical information signals transmitted over the optical link is a optical fiber with a same polarity as the optical link at a transmitted wavelength.

29. The system of claim 19, further comprises a first amplifier proximate the first end of the optical link in connection with the first dispersion device.

30. The system of claim 29, wherein the first amplifier is an erbium-doped fiber amplifier.

31. The system of claim 29, wherein the first amplifier is a distributed Raman amplifier (DRA).

32. The system of claim 19, wherein the second dispersion device proximate the second end of the optical link configured to compensate for dispersion optical information signals is a dispersion compensating module with a polarity opposite the optical link.

33. The system of claim 32, wherein the dispersion compensating module comprises Raman amplified dispersion compensating fiber (DCFRA).

34. The system of claim 19, further comprising an amplifier proximate the second end of the optical link in connection with the second dispersion device.

35. The system of claim 34, wherein the amplifier is a distributed Raman amplifier.

36. The system of claim 34, wherein the amplifier is an erbium-doped fiber amplifier.

37. The system of claim 19, further comprising a plurality of amplifiers with a plurality of dispersion compensators proximate the second end of the optical link configured to compensate for dispersion optical information signals.

38. The system of claim 19, further comprising a plurality of amplifiers with a plurality of dispersion compensators proximate the first end of the optical link configured to pre-distort for dispersion optical information signals.

39. An optical communication system, comprising:
a transmitter operable to multiplex a plurality of optical information signals and generate wavelength division multiplexed (WDM) signals;
an optical link operable to transmit the WDM signals, wherein the transmitter is coupled to one end of the optical link and a receiver is coupled to the other end;
a first dispersion device fiber coupled to the optical link proximate the transmitter with a polarity the same as the optical link operable to pre-distort the WDM signal to introduce an initial dispersion in the WDM signal in the amount of at least 1000 picoseconds per nanometer (ps/nm), wherein this initial dispersion causes a widening of optical pulses of the WDM signal;
a plurality of in-line amplifiers without dispersion compensating modules coupled to the optical link;
a second dispersion device coupled to the optical link proximate the receiver with a polarity opposite the optical link operable to compensate for dispersion in the WDM signals in the amount of at least 10,000 ps/nm; and
the receiver operable to demultiplex the WDM signals.

* * * * *